(12) United States Patent
Saccani (10) Patent No.: US 6,533,297 B2
(45) Date of Patent: *Mar. 18, 2003

(54) SHOPPING CART

(76) Inventor: Richard Lee Saccani, 907 Meadow Ave., Charleroi, PA (US) 15022

( * ) Notice: Subject to any disclaimer, the term of this patent is extended or adjusted under 35 U.S.C. 154(b) by 0 days.

This patent is subject to a terminal disclaimer.

(21) Appl. No.: 10/143,282

(22) Filed: May 10, 2002

(65) Prior Publication Data

US 2002/0135145 A1 Sep. 26, 2002

Related U.S. Application Data

(63) Continuation of application No. 09/247,419, filed on Feb. 10, 1999.

(51) Int. Cl.[7] .......................... B62D 39/00; F16M 13/00
(52) U.S. Cl. .............. 280/33.995; 248/622; 280/33.996
(58) Field of Search ....................... 280/33.991, 33.993, 280/33.994, 33.995, 33.996, 33.997, DIG. 4; 248/582, 592, 597, 622, 295.11, 299.1, 291.1, 292.13, 292.14, 139, 143, 372.1

(56) References Cited

U.S. PATENT DOCUMENTS

| 1,241,402 A | 9/1917 | Kuterback |
| 1,372,538 A | 3/1921 | Olson |
| 1,617,215 A | 2/1927 | Mahr |
| 1,712,712 A | 5/1929 | Morriss |
| 1,837,049 A | 12/1931 | Jackson |
| 1,856,491 A | 5/1932 | Mahr |
| 1,930,660 A | 10/1933 | Richardson |
| 2,132,841 A | 10/1938 | Baumgartner |
| 2,435,022 A | 1/1948 | Troendle |
| 2,639,925 A | 5/1953 | Miklos |
| 2,667,317 A | 1/1954 | Trebules |
| 2,812,187 A | * 11/1957 | Nicholl et al. ......... 280/33.995 |
| 2,958,536 A | * 11/1960 | Young ................... 280/33.991 |
| 2,958,537 A | 11/1960 | Young |
| 3,061,049 A | 10/1962 | Bramley |
| 3,070,384 A | * 12/1962 | Buszak ................. 280/33.995 |
| 3,095,211 A | * 6/1963 | Altherr ................. 280/33.994 |
| 3,184,248 A | * 5/1965 | Hummer ................ 280/33.991 |
| 3,233,912 A | * 2/1966 | Chusid et al. ......... 280/33.995 |
| 3,356,185 A | 12/1967 | Isaacks |
| 3,500,965 A | 3/1970 | Nossokoff et al. |
| 3,664,465 A | 5/1972 | Holland |

(List continued on next page.)

FOREIGN PATENT DOCUMENTS

| FR | 630663 | 12/1927 |
| GB | 224677 | 11/1924 |
| GB | 801164 | 9/1958 |
| SU | 1276551 A1 | 12/1986 |

*Primary Examiner*—Brian L. Johnson
*Assistant Examiner*—G B Klebe
(74) *Attorney, Agent, or Firm*—Alan G. Towner, Esq.; Timothy D. Broms, Esq.; Pietragallo, Bosick & Gordon (57) ABSTRACT

An improved shopping cart with a floating basket: The basket is moveable in response to downward and/or lateral forces applied against the basket. The ability of the basket to move in response to such forces reduces the tendency for the shopping cart to tip over. In one embodiment, at least a portion of the shopping cart basket moves downward as the basket is loaded. In another embodiment, the shopping cart basket pivots upon application of a lateral force to the basket. A further embodiment combines both the vertical movement and pivoting movement of the basket.

21 Claims, 9 Drawing Sheets

U.S. PATENT DOCUMENTS

| | | | |
|---|---|---|---|
| 3,787,063 A | * | 1/1974 | Olover .................. 280/33.991 |
| 3,976,152 A | | 8/1976 | Bell |
| 4,084,663 A | | 4/1978 | Haley |
| 4,116,464 A | | 9/1978 | Haley |
| 4,286,795 A | * | 9/1981 | Rehrig .................. 280/33.996 |
| 4,384,713 A | | 5/1983 | Deutsch et al. |
| 4,840,388 A | | 6/1989 | Doughty |
| 4,976,447 A | | 12/1990 | Batson |
| 5,046,748 A | | 9/1991 | Oat-Judge |
| 5,288,089 A | * | 2/1994 | Bowers .................. 280/33.994 |
| 5,325,938 A | | 7/1994 | King |
| 5,390,942 A | | 2/1995 | Schuster et al. |
| 5,636,853 A | | 6/1997 | Haung |
| 5,649,718 A | | 7/1997 | Groglio |
| 5,755,816 A | | 5/1998 | Schirmer et al. |
| 5,863,054 A | * | 1/1999 | Flores .................. 280/33.995 |
| 5,961,133 A | * | 10/1999 | Perry .................... 280/33.993 |
| 6,123,343 A | * | 9/2000 | Nolting, Jr. et al. .... 280/33.994 |

* cited by examiner

SHOPPING CART

CROSS REFERENCE TO RELATED APPLICATION

This application is a continuation of application Ser. No. 09/247,419 filed Feb. 10, 1999.

FIELD OF THE INVENTION

The present invention relates to shopping carts, and more particularly relates to shopping carts with floating baskets that are movable in response to downward and/or lateral forces.

BACKGROUND INFORMATION

Various types of shopping carts are used in grocery stores, department stores, home improvement stores and the like. A disadvantage of conventional shopping carts is their tendency to tip over, for example, when a child riding in the cart leans out of the cart, or when the cart is loaded with a large number of items and becomes top-heavy.

A particular problem with conventional shopping carts is child safety. Although many shopping cart designs include safety belts, the belts are often broken or missing. Furthermore, even when in operating order, such safety belts are not consistently used. As a result, children are often free to lean or climb out of the child seat.

Some shopping cart designs are disclosed in U.S. Pat. Nos. 2,958,537, 3,095,211, 3,356,185, 3,500,965, 4,840,388, 4,976,447, 5,288,089, 5,325,938 and 5,390,942.

SUMMARY OF THE INVENTION

An aspect of the present invention is to provide a shopping cart including a frame, a basket mounted on the frame, and biasing means for allowing at least a portion of the basket to move in relation to the frame when a force is applied to the basket.

This and other aspects of the present invention will be more apparent from the following description.

DETAILED DESCRIPTION

Figure 1:
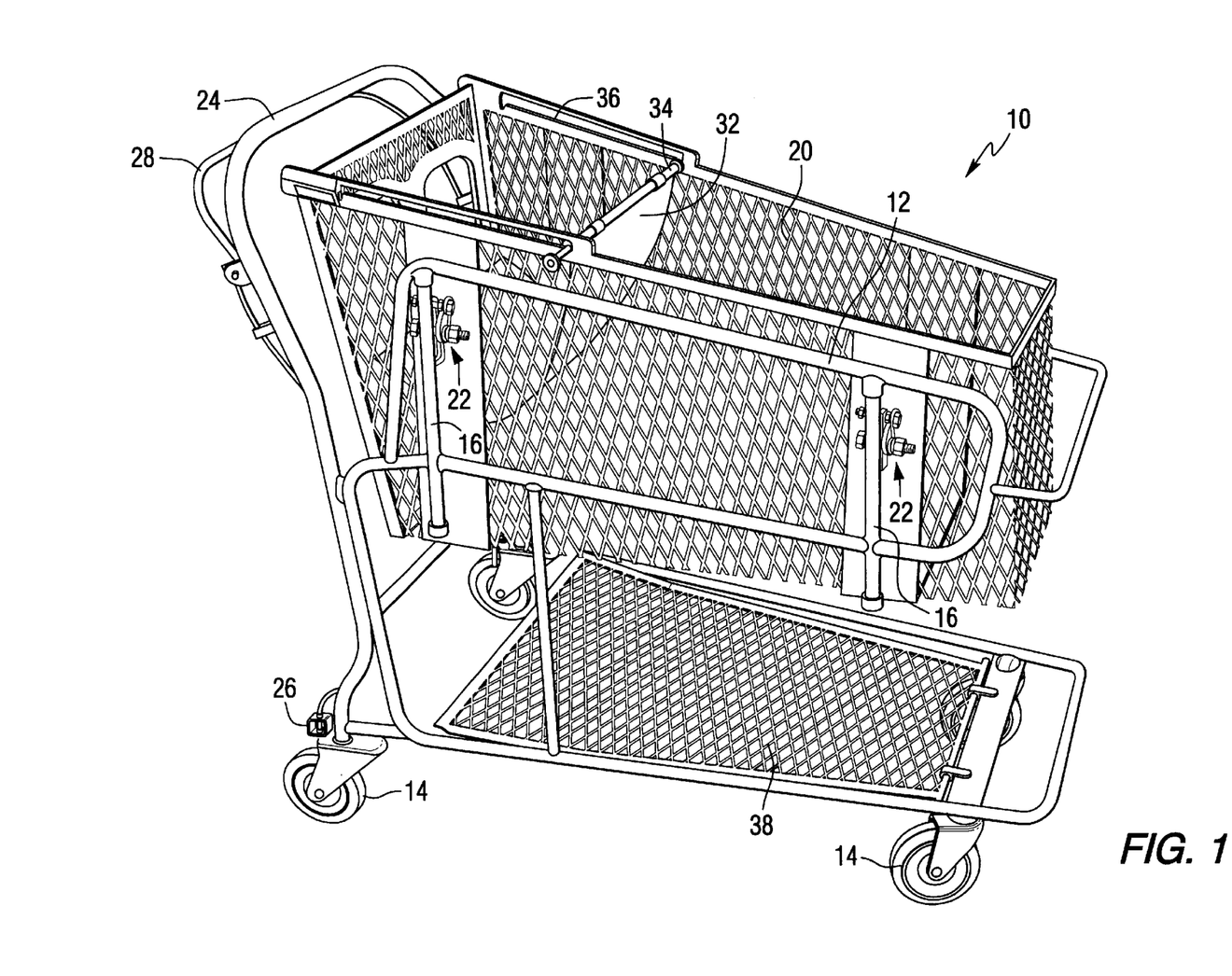
FIG. 1 is an isometric view of a shopping cart in accordance with an embodiment of the present invention.

FIG. 1 is an isometric view of a shopping cart 10 in accordance with an embodiment of the present invention. The shopping cart 10 includes a frame 12 supported on four wheels 14. The frame 12 includes vertical support members 16. A basket 20 is mounted on the vertical support members 16 of the frame 12 by couplings 22. As shown most clearly in FIG. 4, each of the couplings 22 may be protected by a cover 23. Preferably, the wheels 14 are spaced widely apart and extend horizontally beyond the basket 20 in order to provide increased stability.

The shopping cart 10 includes a handle 24 secured to the frame 12. In the embodiment shown in FIGS. 1–4, the shopping cart 12 includes an automatic brake assembly 26 which locks at least one of the rear wheels 14 of the cart against rotation. A brake handle 28 disengages the brake assembly 26 when the brake handle 28 is moved toward the cart handle 24. In this manner, the brake assembly 26 remains engaged until an operator of the shopping cart 10 grasps the brake handle 28 and shopping cart handle 24 and pulls them together. As shown most clearly in FIG. 2, the brake handle 28 is preferably designed such that when multiple carts are nested together the brake handle 28 engages the slanted upper portion of the frame 12 and/or the slanted upper portion of the basket 20 of the rearwardly adjacent cart to thereby push the brake handle 28 toward the cart handle 24. In this manner, when multiple carts are nested together, the brakes of all but the rear cart are disengaged, thereby allowing the multiple nested carts to be moved to a desired location by grasping the cart handle 24 and brake handle 28 of the rear cart.

Figure 4:
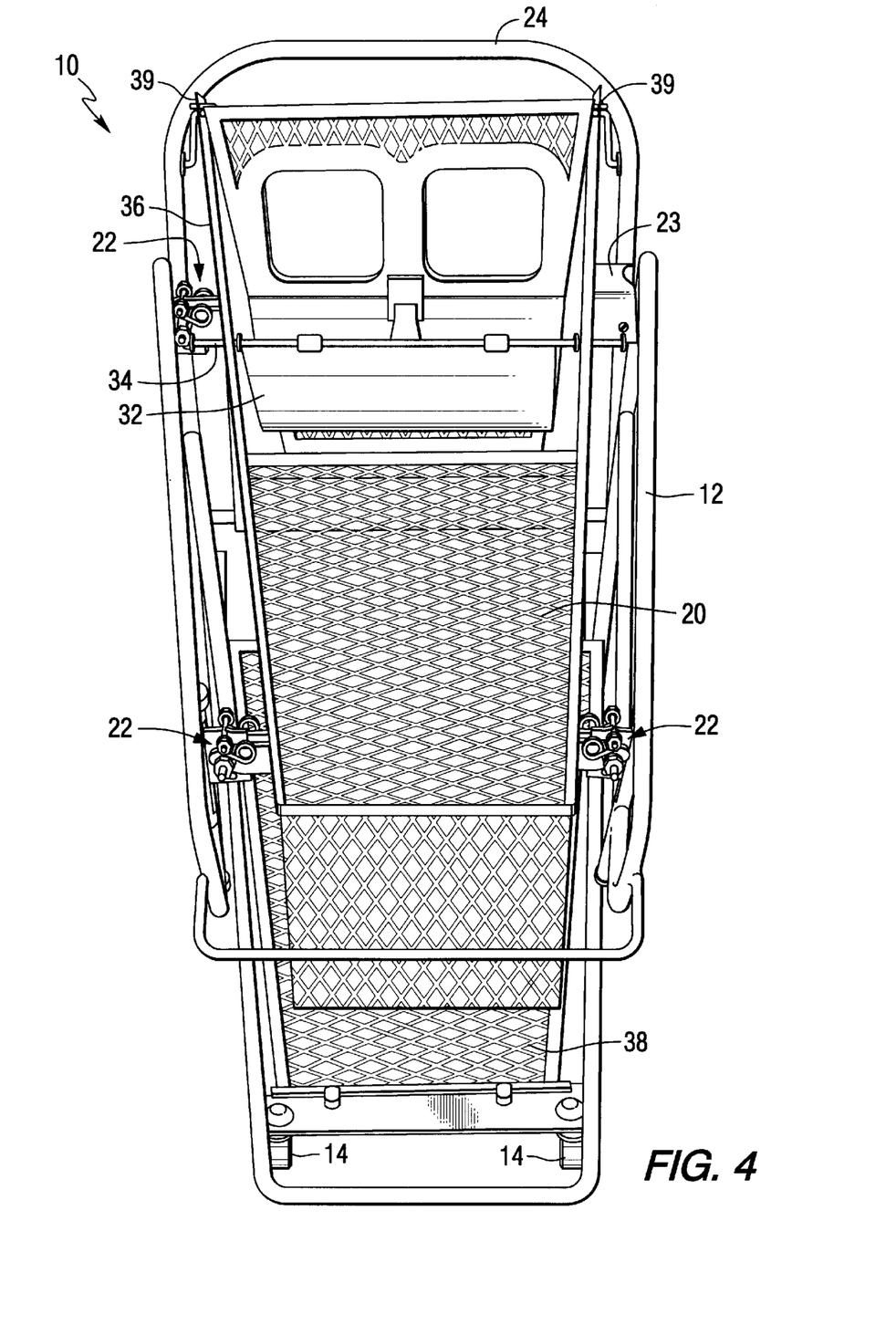
FIG. 4 is a perspective view of the shopping cart of FIG. 1.

As shown most clearly in FIGS. 1 and 4, the shopping cart 10 optionally includes a child seat 32. In the embodiment shown in the figures, the child seat 32 comprises a flexible hammock supported by a bar 34. The bar 34 may be moved from an open position as shown in FIG. 1 to a closed position along slots 36 provided at the top of the basket 20. The use of the flexible hammock child seat 32 reduces the ability of a child riding in the seat to gain leverage and lift itself out of the seat. The child seat 32 may optionally include a safety belt (not shown). For example, the safety belt may be generally Y shaped with two points of securement on the bar 34 and one point of securement on the rear wall of the cart 20, between the child's legs. Although the child seat 32 shown in the figures comprises a flexible hammock, any other suitable type of child seat may optionally be used.

Figure 2:
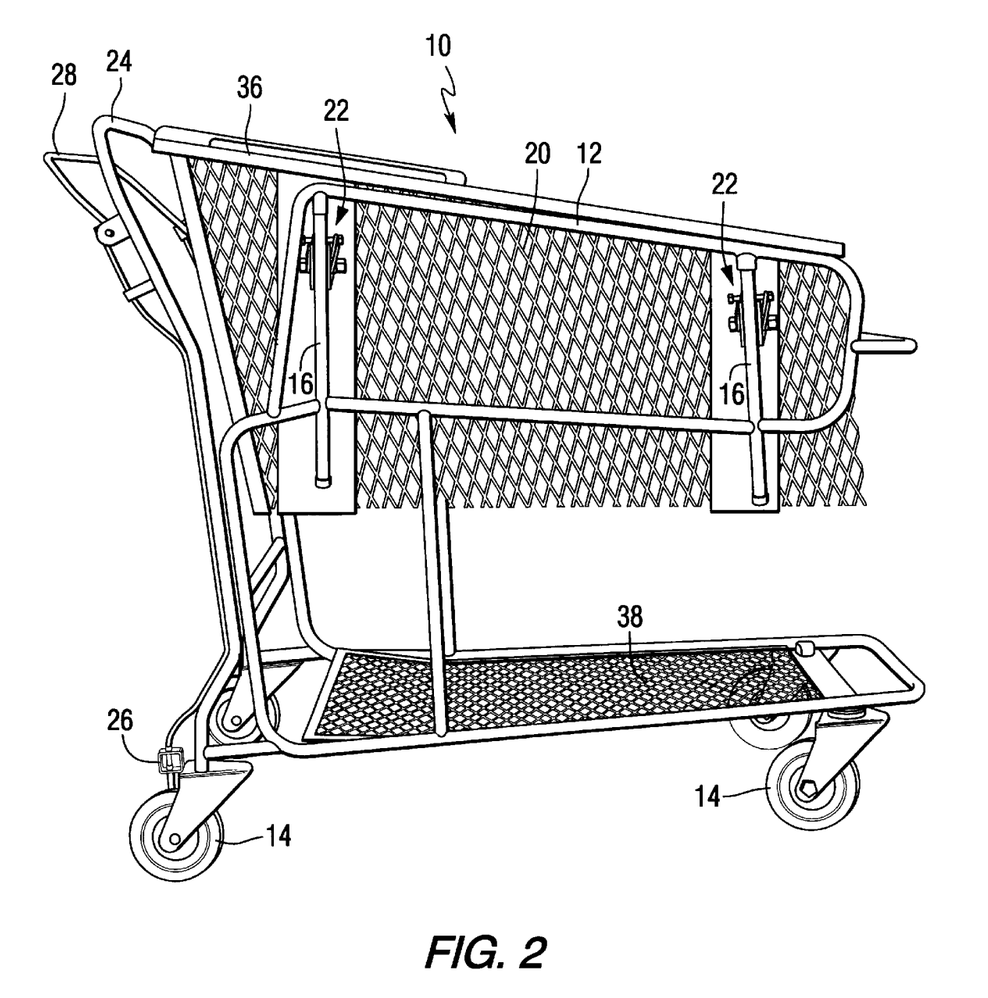
FIG. 2 is a side view of the shopping cart of FIG. 1 with the basket in an unloaded position.
Figure 3:
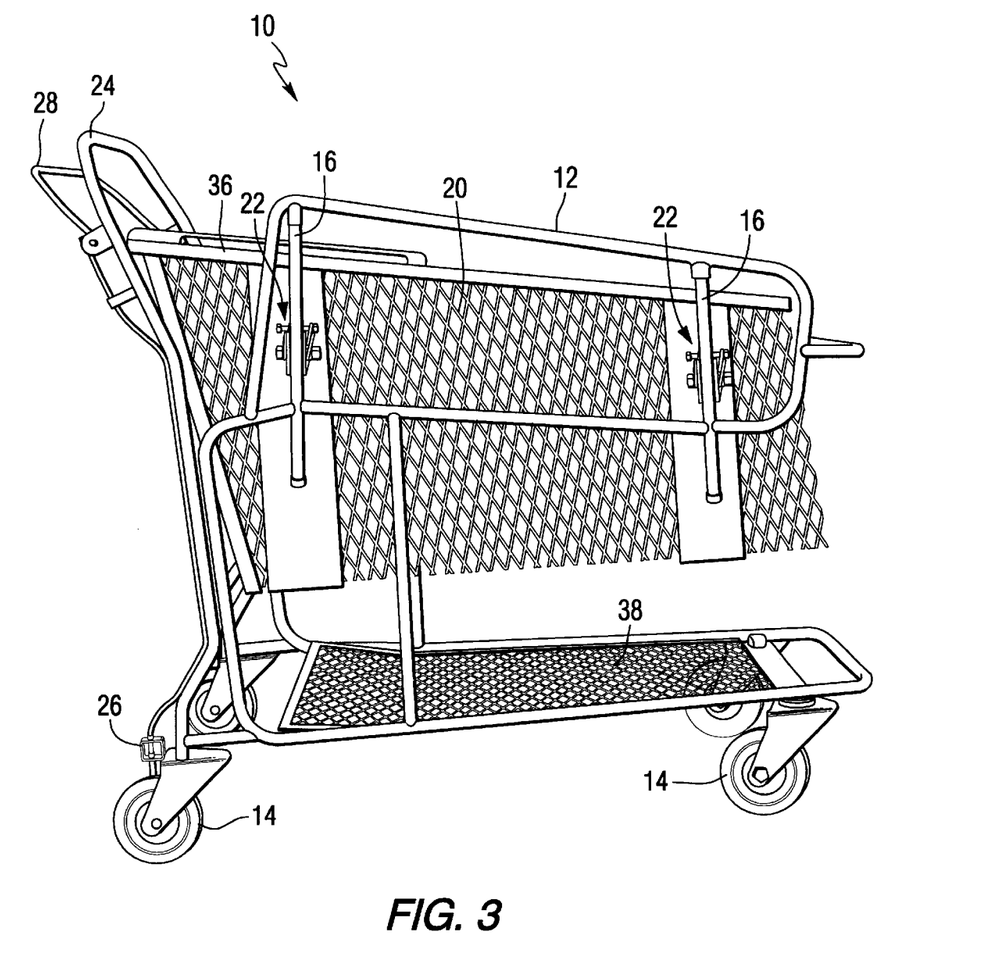
FIG. 3 is a side view of the shopping cart of FIG. 1 with the basket in a loaded position.

As shown most clearly in FIGS. 1–3, the shopping cart 10 includes a lower shelf 38 which may be used to support additional items. The lower shelf 38 is preferably oriented at a slight angle which facilitates nesting of multiple carts for storage purposes. The rear wall of the basket 20 adjacent the handle 24 is preferably pivoted at its upper edge 39, as shown in FIG. 4, to facilitate nesting of multiple carts for storage.

Figure 5:
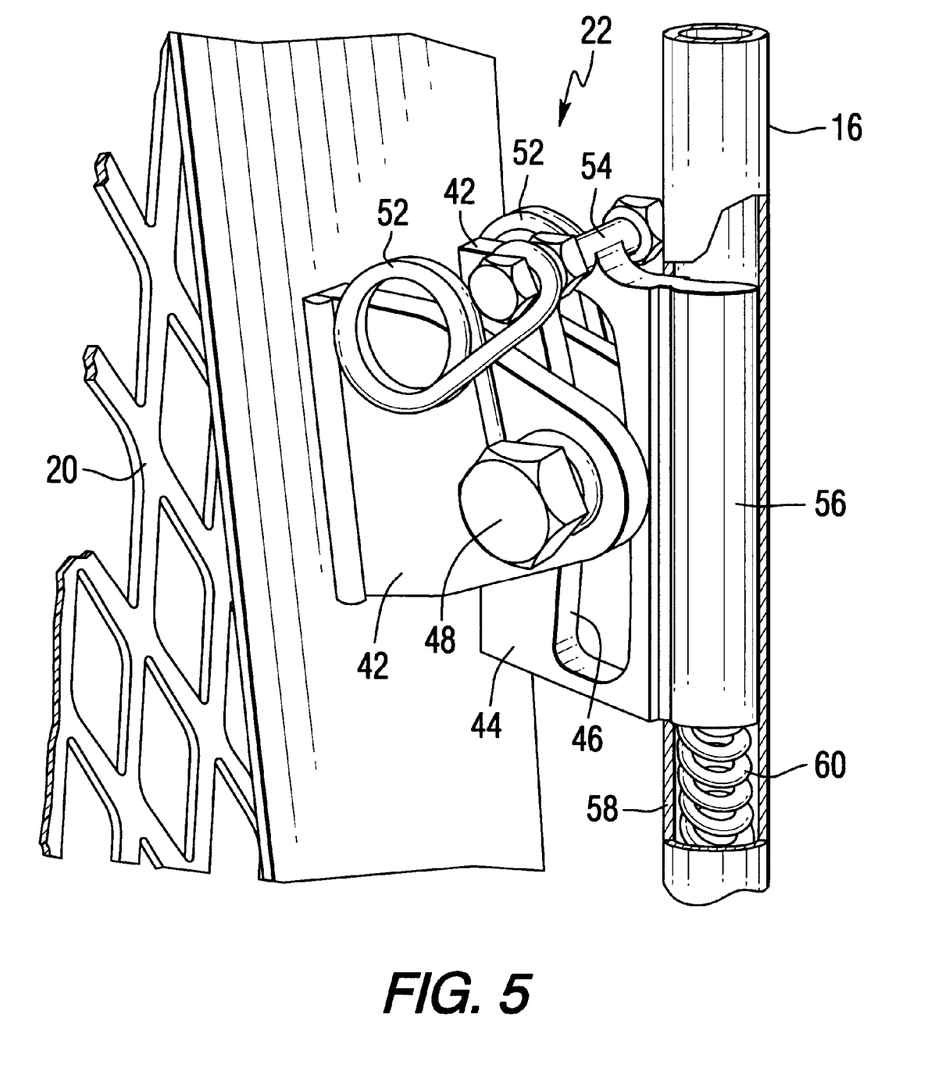
FIG. 5 is a side view of a coupling between a shopping cart frame and basket in accordance with an embodiment of the present invention.
Figure 6:
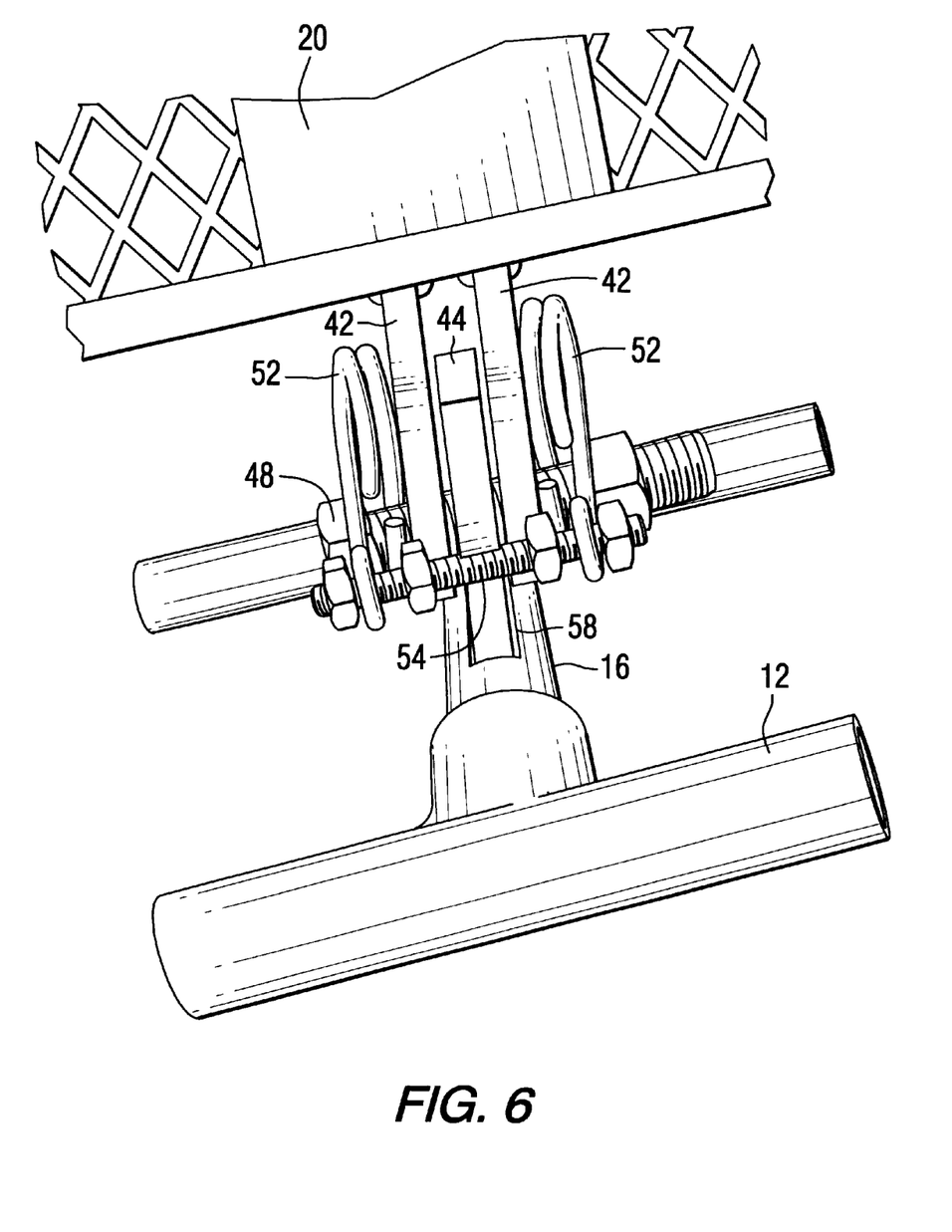
FIG. 6 is a top view of the coupling of FIG. 5.

The coupling 22 between one of the support members 16 and the basket 20 is shown in detail in FIGS. 5 and 6. The coupling 22 includes two parallel brackets 42 secured to the basket 20 by any suitable means such as welding or mechanical fasteners. A slide member 44 positioned between the brackets 42 includes a generally arcuate slot 46. A bolt 48 or other suitable fastener extends between the brackets 42 through the slot 46 in the slide member 44. Torsion springs 52 are positioned adjacent to the exterior faces of the brackets 42. One end of each torsion spring 52 is secured to the bolt 48, while the other end of the torsion spring 52 is secured to another bolt 54 which, in turn, is fastened to the top of the slide member 44. The bolt 54 may be secured to the slide member 44 by any suitable means such as threaded engagement, welding or the like.

The slide member 44 includes an edge portion 56 which extends into the interior of the vertical support 16, and which slides along a vertical slot 58 in the support member 16. A compression spring 60 inside the vertical support member 16 contacts the bottom of the edge portion 56 of the slide member 44 to thereby bias the slide member 44 in an upward direction.

The shopping cart shown in FIGS. 1–6 operates as follows. The basket 20 floats or moves vertically with respect to the frame 12 through the action of the slide members 44 which move in a generally vertical direction with respect to the vertical support members 16. As used herein, the term "moves vertically" includes movement in a direction normal to the ground and any other non-normal direction having a vertical component. In an unloaded position as shown in FIG. 2, the basket 20 is at its uppermost position with respect to the frame 12. Upon loading of the basket 20 with a child, groceries or the like, the basket moves downward with respect to the frame 12, as illustrated in FIG. 3. As the load in the basket 20 is increased, the basket 20 lowers a proportional amount against the bias of the springs 60 inside the vertical support members 16. This lowering action serves to lower the center of gravity of the shopping cart 10 as it is loaded, thereby reducing the tendency of the shopping cart to tip over as it becomes top-heavy. As shown in FIG. 3, when the basket 20 is in the lowered position, the frame 12 and cart handle 24 extend above the basket 20. The frame 12 and cart handle 24 may thus serve as a roll bar in case the cart tips over with a child riding in the child seat.

In addition to the generally vertical motion of the basket 20 illustrated in. FIGS. 2 and 3, the basket 20 may also pivot or move laterally with respect to the frame 12. The couplings 22 permit such pivoting or lateral movement through the relative movement of the brackets 42 with respect to the slide member, 44. The bolt 48 secured to the brackets 42 is free to slide along the arcuate path defined by the slot 46 in the slide member 44. In the position shown in FIG. 5, the bolt 48 is positioned at the approximate midpoint of the slot 46. However, upon the application of a lateral or rotational force against the basket 20, the bolt 48 may move upward or downward within the slot 46 against the force of the springs 52. For example, if the upper portion of the basket 20 shown in FIG. 5 is pushed in a rightward direction, the bolt 48 rotates clockwise downward in the slot 46 against the bias of the springs 52. In contrast, if the upper portion of the basket 20 shown in FIG. 5 is moved toward the left, the bolt 48 travels upward in a counterclockwise direction in slot 46. This action of the couplings 22 permits the basket 20 to pivot along an axis that is substantially parallel with the travel direction of the shopping cart 10. In this manner, when a lateral force such as a child leaning to the left or right side of the cart 10 is applied against the basket 20, that force is counteracted by the action of the couplings 22. Thus, the basket 20 will initially pivot upon application of such a lateral force, and will then attempt to level itself through the action of the couplings 22. This is an important safety feature, particularly when a child is riding in the basket 20. If the child attempts to lean sideways out of the basket, the basket first pivots in response to the initial lateral force. This pivoting action absorbs at least some of the lateral force, thereby reducing or eliminating tipping of the entire cart. Second, the resilient couplings 22 bias the basket back toward a level position, thereby forcing the leaning child back into the basket.

However, upon the application of a lateral or rotational force against the basket 20, the bolt 48 may move upward or downward within the slot 46 against the force of the springs 52. For example, if the upper portion of the basket 20 shown in FIG. 5 is pushed in a rightward direction, the bolt 48 rotates counterclockwise downward in the slot 46 against the bias of the springs 52. In contrast, if the upper portion of the basket 20 shown in FIG. 5 is moved toward the left, the bolt 48 travels upward in a counterclockwise direction in slot 46. This action of the couplings 22 permits the basket 20 to pivot along an axis that is substantially parallel with the travel direction of the shopping cart 10. In this manner, when a lateral force such as a child leaning to the left or right side of the cart 10 is applied against the basket 20, that force is counteracted by the action of the couplings 22. Thus, the basket 20 will initially pivot upon application of such a lateral force, and will then attempt to level itself through the action of the couplings 22. This is an important safety feature, particularly when a child is riding in the basket 20. If the child attempts to lean sideways out of the basket, the basket first pivots in response to the initial lateral force. This pivoting action absorbs at least some of the lateral force, thereby reducing or eliminating tipping of the entire cart. Second, the resilient couplings 22 bias the basket back toward a level position, thereby forcing the leaning child back into the basket.

Figure 7:
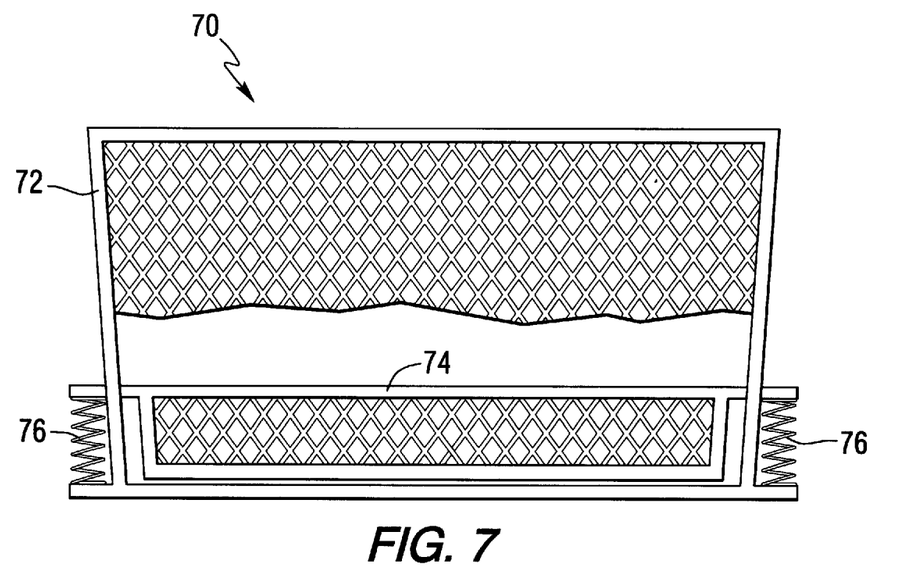
FIG. 7 is a partially schematic side view of a shopping cart basket in accordance with an embodiment of the present invention.
Figure 8:
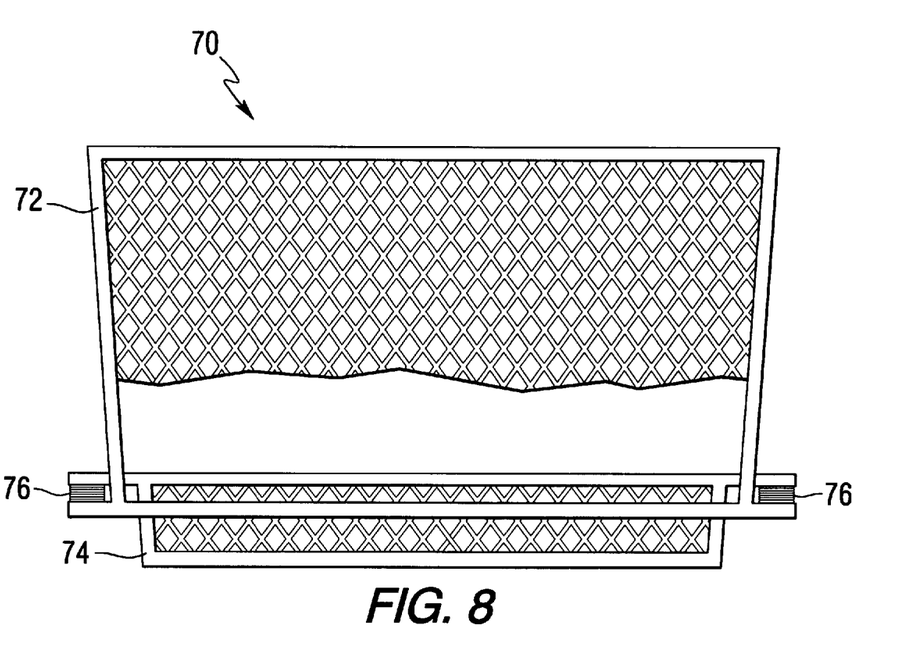
FIG. 8 is a partially schematic side view of the shopping cart basket of FIG. 7 with a bottom tray of the basket in a loaded position.
Figure 9:
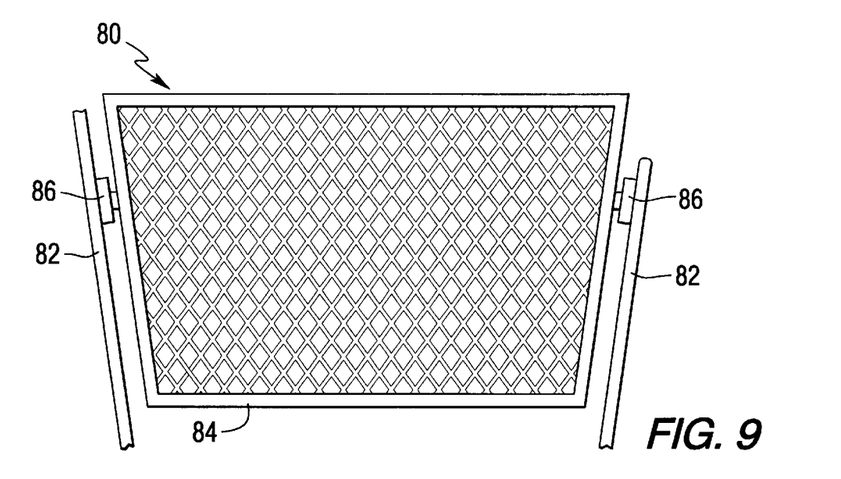
FIG. 9 is a partially schematic side view of a shopping cart frame and basket in accordance with another embodiment of the present invention.

FIGS. 7 and 8 illustrate a shopping cart basket 70 in accordance with another embodiment of the present invention. The basket 70 includes a main portion 72 comprising the sidewalls of the basket, and further comprises a bottom tray 74. Compression springs 76 mounted between the main portion 72 and bottom tray 74 force the bottom tray 74 to an upward position, as shown in FIG. 7. When items are loaded in the basket 70, the bottom tray 74 moves downward in relation to the main portion 72 against the force of the compression springs 76. In this manner, as the basket is loaded, the bottom tray 74 moves downward in proportion to the weight of the items loaded in the basket. The downward movement of the bottom tray 74 serves to lower the center of gravity of the shopping cart as it is loaded, thereby reducing the tendency of the cart to tip over.

Figure 10:
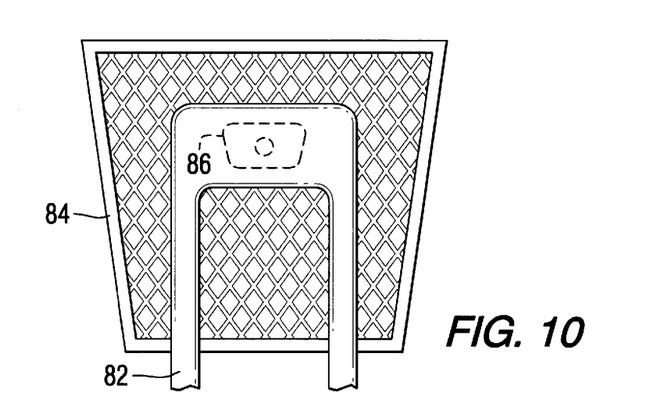
FIG. 10 is a partially schematic end view of the shopping cart frame and basket of FIG. 9.
Figure 11:
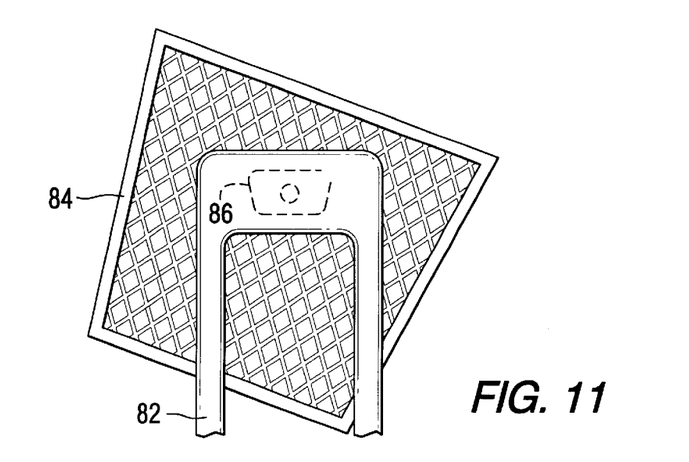
FIG. 11 is a partially schematic end view of the shopping cart frame and basket of FIG. 9, illustrating the pivoting action of the basket when a lateral force is applied to the basket.

FIGS. 9–13 illustrate a shopping cart 80 in accordance with another embodiment of the present invention. In this embodiment, the shopping cart 80 includes a frame 82 which supports a pivoting basket 84 by means of mounting assemblies 86. As shown most clearly by the end views of FIGS. 10 and 11, the basket 84 is normally in a level position as shown in FIG. 10, but can pivot as shown in FIG. 11 upon the application of a lateral force to the basket 84.

Figure 12:
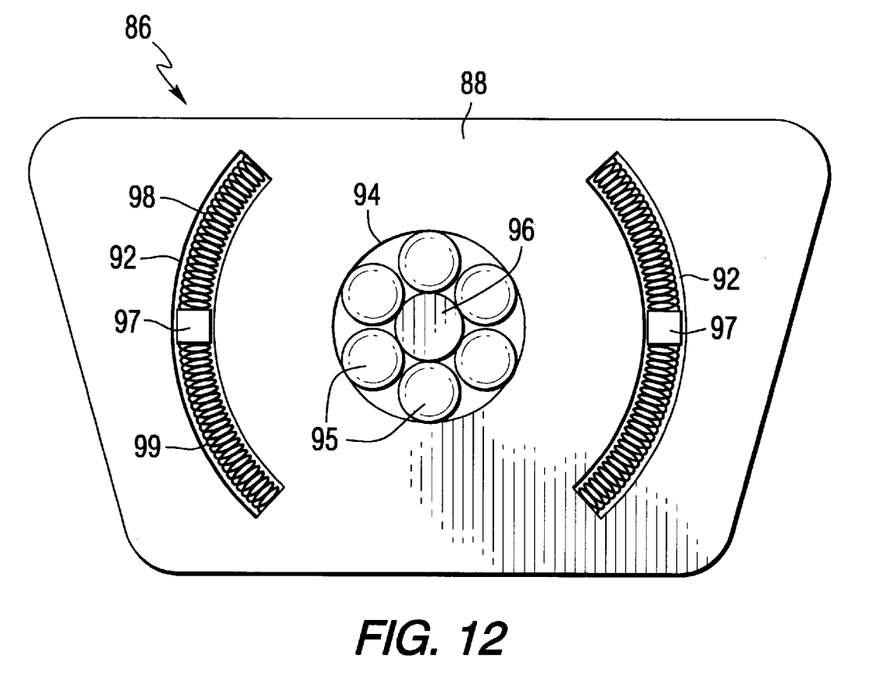
FIG. 12 is a side view of a pivoting coupling of the shopping cart frame and basket shown in FIG. 10.
Figure 13:
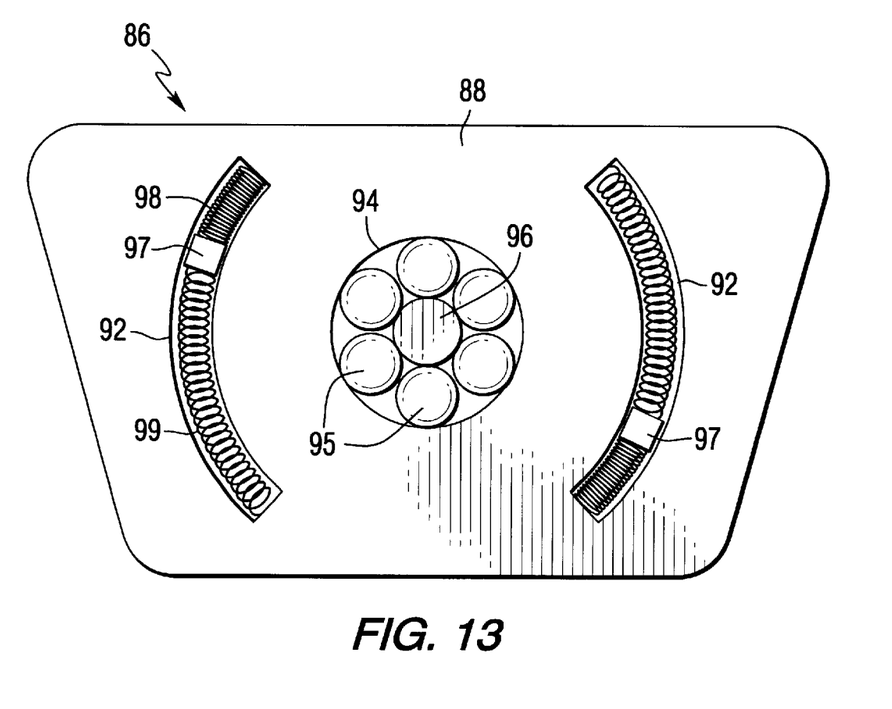
FIG. 13 is a side view of the pivoting coupling of FIG. 12, illustrating the position of the coupling when the basket is pivoted as shown in FIG. 11.

FIGS. 12 and 13 illustrate the details of the mounting assembly 86. The mounting assembly 86 includes a bracket 88 having arcuate slots 92 therein. A cylindrical bearing race 94 is provided in the bracket 88. Several bearings 95, such as ball bearings or roller bearings, are provided inside the race 94. The bracket 88 of the mounting assembly 86 is fastened to the frame 82 of the shopping cart 80, as shown most clearly in FIG. 9. The bracket 88 may be mounted on the frame 82 by any suitable means such as welding, mechanical fasteners or the like.

As shown in FIGS. 12 and 13, a rod 96 which is attached to the basket 80 extends into the cylindrical race 94 and contacts the bearings 95. The rod 96 is thus free to rotate in relation to the stationary bracket 88. Two pins 97 secured to the basket 84 are moveable along arcuate paths in the slots 92 of the bracket 88. Two springs 98 and 99 positioned in each slot 92 press against the pin 97. In the position shown in FIG. 12, the pins 97 are in a substantially horizontal position in the middle of the arcuate slots 92. In the pivoted position shown in FIG. 13, the pins 97 are rotated clockwise to a non-horizontal orientation against the force of the springs 98 and 99.

In the embodiment shown in FIGS. 9–13, when a lateral force such as a child leaning to the left or right side of the cart 80 is applied against the basket 84, that force is counteracted by the action of the couplings 86. The basket 84 initially pivots upon application of such a lateral force, and then attempts to level itself through the action of the couplings 86.

In accordance with the present invention, the shopping cart basket may move vertically and may also pivot, for example, as illustrated in the embodiment of FIGS. 1–6. Alternatively, at least a portion of the shopping cart basket may primarily move in a vertical direction upon loading of the basket, as shown in the embodiment of FIGS. 7 and 8. As another example, the shopping cart basket may pivot or move laterally, as shown in the embodiment of FIGS. 9–13. While specific types of arrangements for vertical and/or lateral movement are disclosed in the present figures, other types of couplings which achieve the desired floating function of the shopping cart basket may be used.

Whereas particular embodiments of this invention have been described above for purposes of illustration, it will be evident to those skilled in the art that numerous variations of the details of the present invention may be made without departing from the invention as defined in the appended claims.

What is claimed is:

1. A shopping cart comprising:
   a frame;
   a single basket mounted on the frame, wherein the single basket comprises a bottom, sidewalls, and a rear wall pivotally mounted on the sidewalls; and
   biasing means for allowing the single basket to move in relation to the frame when a load is placed in the single basket.

2. The shopping cart of claim 1, wherein the entire basket moves in relation to the frame when a load is placed in the basket.

3. The shopping cart of claim 1, wherein the basket further comprises a front wall connected to the sidewalls.

4. The shopping cart of claim 1, wherein the sidewalls are substantially vertical.

5. The shopping cart of claim 1, wherein the sidewalls are substantially planar.

6. The shopping cart of claim 1, wherein the basket moves to multiple vertical positions in relation to the frame proportional to the amount of the load placed in the basket.

7. The shopping cart of claim 1, wherein an uppermost portion of the basket is vertically above an uppermost portion of the frame when the load is not placed in the basket, and the uppermost portion of the basket is vertically below the uppermost portion of the frame when the load is placed in the basket.

8. The shopping cart of claim 1, wherein the basket pivots in relation to the frame when a force is applied to the basket.

9. The shopping cart of claim 8, wherein the basket pivots around an axis substantially parallel with a travel direction of the shopping cart.

10. The shopping cart of claim 1, wherein the basket moves vertically in relation to the frame when the load is placed in the basket, and moves laterally in relation to the frame when a lateral force is applied to the basket.

11. The shopping cart of claim 10, wherein the basket moves to multiple vertical positions in relation to the frame proportional to the amount of the load placed in the basket.

12. The shopping cart of claim 10, wherein an uppermost portion of the basket is vertically above an uppermost portion of the frame when the load is not placed in the basket, and the uppermost portion of the basket is vertically below the uppermost portion of the frame when the load is placed in the basket.

13. The shopping cart of claim 10, wherein the basket pivots when the lateral force is applied to the basket.

14. The shopping cart of claim 13, wherein the basket pivots around an axis substantially parallel with a travel direction of the shopping cart.

15. The shopping cart of claim 1, further comprising wheels mounted on the frame which extend horizontally beyond the basket.

16. The shopping cart of claim 1, further comprising two rear wheels and two front wheels mounted on the frame of the shopping cart, wherein the two rear wheels extend horizontally beyond the basket in a direction parallel with a travel direction of the shopping cart.

17. The shopping cart of claim 1, wherein the shopping cart further comprises a child seat comprising a flexible hammock.

18. The shopping cart of claim 1, wherein the shopping cart further comprises a brake.

19. The shopping cart of claim 18, wherein the brake is automatically engaged unless the operator of the cart grasps a handle of the shopping cart.

20. The shopping cart of claim 18, wherein the brake comprises means for disengaging the brake when another cart is nested inside the shopping cart, whereby a handle of the brake is contacted by a basket or a frame of the other cart to thereby push the handle of the brake toward a handle of the shopping cart to disengage the brake.

21. A shopping cart comprising;
   wheels;
   a frame comprising a base portion secured to the wheels and substantially vertical support members immovably secured with respect to the base portion;
   a basket comprising a bottom, a rear wall, a front wall, and sidewalls, wherein the rear wall is pivotally mounted on the sidewalls; and
   couplings between the substantially vertical support members and the basket, wherein the basket is movable along the substantially vertical support members to multiple positions.

* * * * *